(No Model.)

H. H. WHITE.
WHISTLE.

No. 547,100. Patented Oct. 1, 1895.

WITNESSES:
H. P. Guillo
John R. Snow

INVENTOR
Herbert H. White
BY
O. R. Mitchell,
ATTORNEY.

United States Patent Office.

HERBERT H. WHITE, OF CAMBRIDGE, MASSACHUSETTS.

WHISTLE.

SPECIFICATION forming part of Letters Patent No. 547,100, dated October 1, 1895.

Application filed March 14, 1895. Serial No. 541,669. (No model.)

*To all whom it may concern:*

Be it known that I, HERBERT H. WHITE, of Cambridge, in the county of Middlesex and State of Massachusetts, have invented a new and useful Improvement in Whistles, of which the following is a specification, reference being had to the accompanying drawings, in which—

Figure 1:
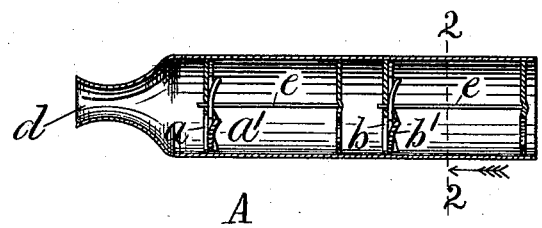
Figure 2:
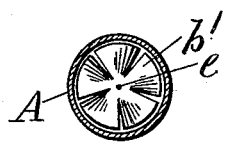
Figure 3:
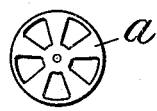
Figure 5:
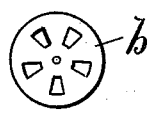
Figure 4:
Figure 6:
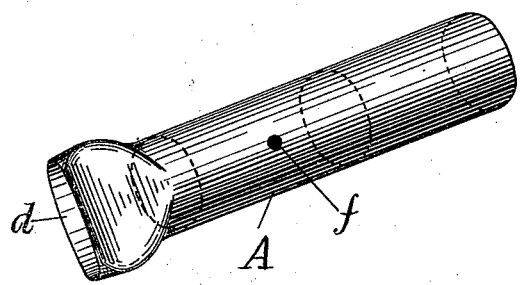

Figure 1 is a longitudinal section of my improved whistle. Fig. 2 is a cross-section on line 2 2 of Fig. 1. Figs. 3, 4, and 5 show the fixed and rotating disks detached. Fig. 6 is a perspective view.

Whistles in which the sound is produced by the combination within a tube of a fixed perforated disk and a rotary disk, which latter is caused to rotate by the passage of air through the tube and in its rotation closes and opens the apertures in the fixed disk, thus causing sound-waves of different pitches and amplitudes to be emitted, according to the force of the current of air and the consequent speed of the rotating disk, have long been known, and my invention is an improvement upon such whistles; and it consists in arranging in series within one tube two or more fixed disks and two or more revolving disks, the first pair of disks in the series serving to break the force of the current of air upon the pair of disks next in the series, thus causing the second disk to emit a lower note than it otherwise would by reason of the lessened speed of the moving disk consequent upon the diminished force of the air-current; and in perforations, one or more, in the tube between the pairs of disks. The result in either case is a compound sound, which is formed of the distinct notes emitted by each pair of disks, and which is much more powerful than can be produced by one pair of disks, and which is different in quality from any sound that can be produced by a single pair of disks. The sound is not only more powerful, but it is continually varied by the varied relative speed of the moving disks with every alteration in speed of the air-current.

In the drawings, A represents the tube; $a\,a'$, the first pair of disks; $b\,b'$, the second pair of disks; $d$, the mouthpiece, and $e$ the pin upon which the moving disks rotate. The rotating disks have wings arranged at a slight angle in order that the current of air may cause them to revolve. (See Fig. 4.)

In Fig. 6 I show a small vent-hole $f$ in the tube between the first and second pairs of disks, and thereby the air-pressure upon the second pair of disks is much reduced owing to the escape of air through the vent $f$, thus causing the second rotating disk to revolve at a much slower speed than the first rotating disk, and consequently to emit a different note. The vent-hole $f$ will be covered by the finger if this effect is not wished.

What I claim is—

1. In combination the tube A and a plurality of pairs of disks $a\,a'$, $b\,b'$, one disk of each pair being fixed and the other arranged to rotate, the plurality of pairs of disks being arranged in series within the tube, substantially as shown and described.

2. In combination tube A, a plurality of pairs of disks $a\,a'$, $b\,b'$, arranged in series within the tube, and a vent hole $f$, between the pairs of disks, substantially as shown and described.

HERBERT H. WHITE.

Witnesses:
JOHN R. SNOW,
O. R. MITCHELL.